United States Patent Office 3,139,718
Patented July 7, 1964

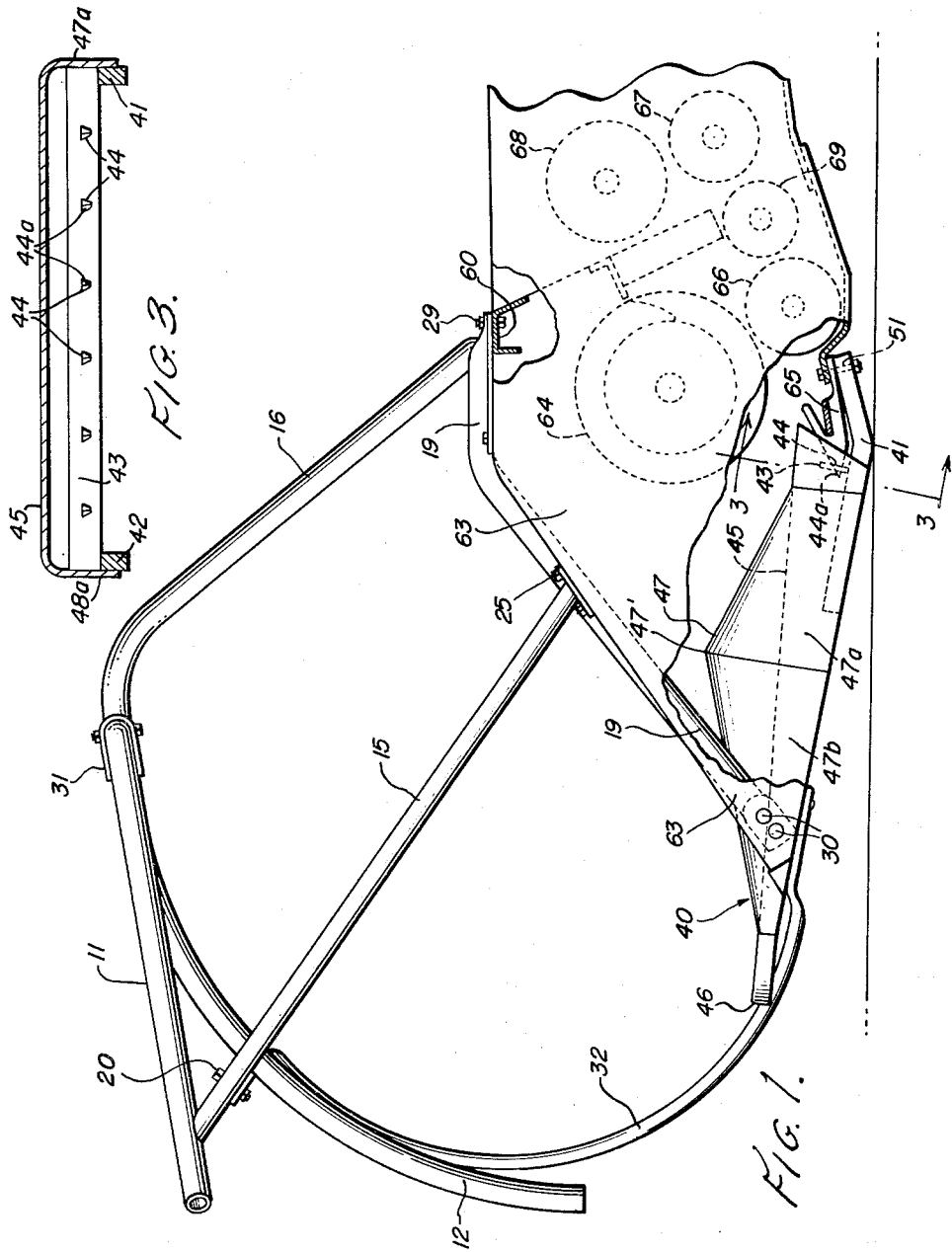

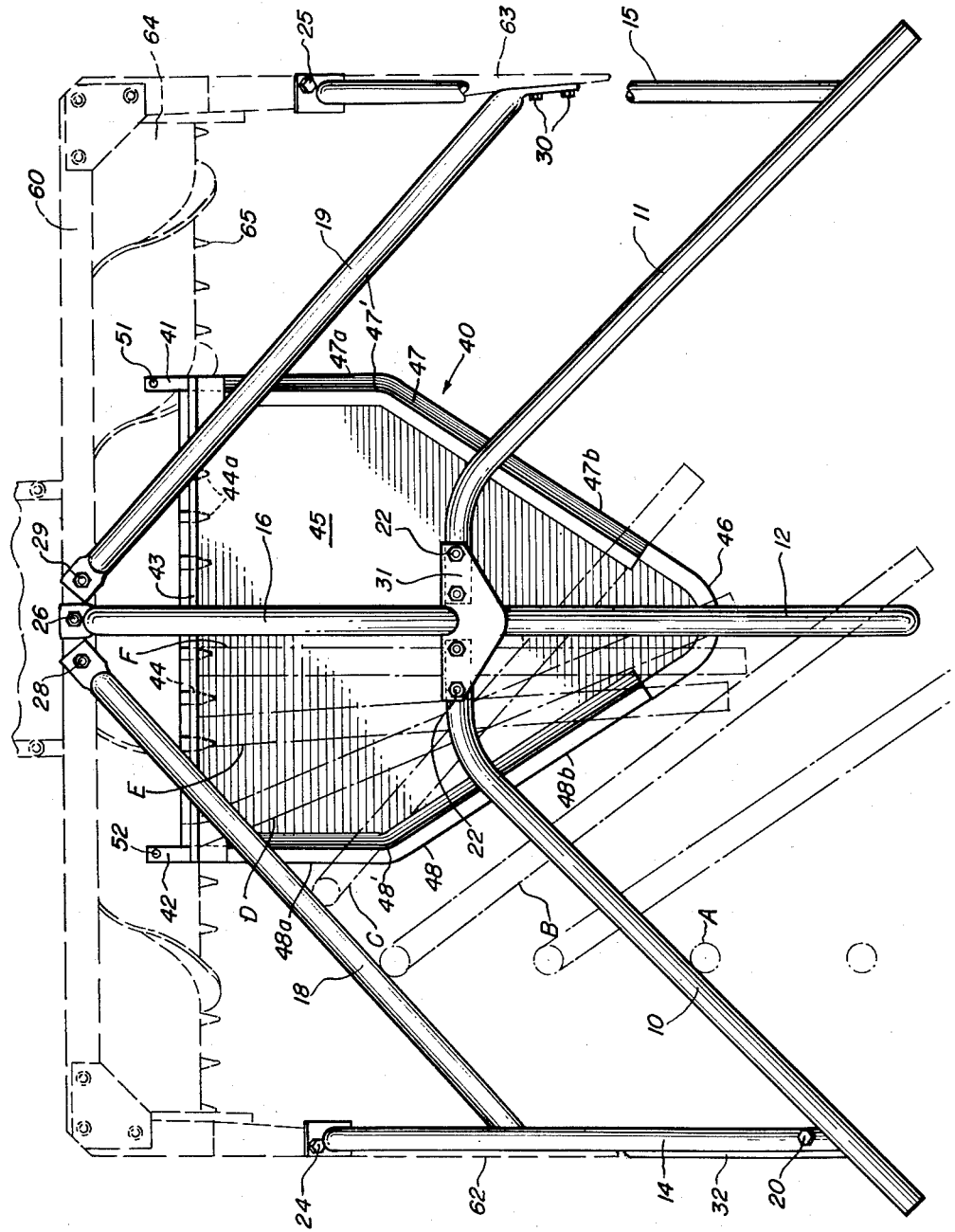

3,139,718
ROW CROP ATTACHMENT
Calvin P. Rickerd, La Grange, Raymond C. Fischer, Hinsdale, and Ernest C. Carlson, Wheaton, Ill., assignors to International Harvester Company, Chicago, Ill., a corporation of New Jersey
Filed Apr. 10, 1962, Ser. No. 186,504
8 Claims. (Cl. 56—119)

The present invention relates generally to improvements in row crop attachments for harvesters, and more particularly to new and improved row crop attachments for a harvester of the type disclosed in the copending application to Raymond C. Fischer, application Serial No. 186,503, filed on August 6, 1962.

In the field of row crop harvesting, it has been the general practice to employ row crop attachments that include power drive means for controlling the stalks before severance and for feeding them to the harvesting machine in the desired manner. Although such devices have served their purpose, these mechanical conveying means add considerable weight and cost to the attachment and obviously a row crop attachment having no moving parts would be cheaper, lighter, and less likely to break down.

The general purpose of this invention is to provide a row crop attachment which embraces all the advantages of similarly employed row crop attachments and possesses none of the aforedescribed disadvantages. To attain this, the present invention contemplates a unique attachment which bends the stalks, supports and positions them to be severed, and stacks the stalks in parallel arrangement to be delivered to the chopper. This is attained by bending the stalks of two parallel rows forward and inwardly, preventing inward movement beyond a center line and at the same time supporting the stalks so that they will not fall into forward standing stalks, severing the stalks at their butt ends, conveying the butt ends of the stalks towards the center line between the rows, and arranging the stalks in parallel alignment on a flat tray to be conveyed to the chopper.

An object of the present invention is the provision of a new method of harvesting row crops.

Another object is to provide for a harvesting machine a row crop attachment having no moving parts.

A further object of the invention is the provision of a row crop attachment for a harvesting machine that will support the stalks while they are severed and then arrange them in an orderly manner to be conveyed to the chopper.

Still another object is to provide a row crop attachment for a harvesting machine of the type having a sickle operative in a line normal to the direction of movement of the harvesting machine, a pickup roller parallel to the sickle and located behind it and an auger cooperating with said pickup roll and overlying said sickle.

Yet, another object of the present invention is the provision of a row crop attachment for a harvesting machine that will guide and position the stalks to be severed and cause the severed stalks to be deposited on a flat tray, from which the stalks are delivered to the chopper of the harvesting machine.

These and other objects of the invention will become more apparent from the specification and drawings, wherein:

FIGURE 1 shows a side elevation with parts broken away of the row crop attachment mounted on a harvesting machine.

FIGURE 2 is a plan view of the row crop attachment mounted on a harvesting machine, shown in broken lines.

FIGURE 3 is a sectional view taken substantially on line 3—3 of FIGURE 2.

Referring now to the drawings wherein like reference characters designate like or corresponding parts throughout the several views, there is shown in FIGURES 1 and 2 a harvesting machine of the type referred to above wherein 60 designates the front frame member, 62 and 63 the dividers, 64 the upper auger, 65 the sickle, 66 the pickup roll, and 67, 68 and 69 the feed rolls. Reference may be had to copending application Serial No. 186,503 for a complete description of this harvesting machine.

The row crop attachment comprises two main parts, the prostrating means and the center divider. The prostrating means is mounted directly to the harvesting machine and comprises a mounting bar 16 which is secured to the front frame member 60 of the harvesting machine by nut and bolt 26. The mounting bar 16 extends forward and upwardly from the front frame member to a height somewhat lower than the height of the stalks to be harvested. It is then bent downwardly, forming a stalk support rod 12 which terminates a substantial distance above the level of the ground. Secured to said mounting bar 16 at its highest point is a plate 31 which has secured thereto by bolts and nuts 22 prostrating bars 10 and 11 which extend forward and outwardly from said mounting bar 16. The outer extremities of said prostrating bars 10 and 11 are secured to the forward ends of support bars 14 and 15, respectively. The other ends of the support bars 14 and 15 are secured by nuts and bolts 24 and 25 to the dividers 62 and 63 of the harvesting machine. A second set of prostrating bars 18 and 19 similar to prostrating bars 10 and 11 are secured to the front frame member 60 of the harvesting machine, by bolts 28 and 29, extending forwardly and outwardly therefrom, and secured to the dividers 62 and 63 by bolts 30.

The central divider of the row crop harvesting unit comprises a flat plate or tray 45 having a pair of parallel bars 41 and 42 extending rearwardly therefrom, said bars having apertures 51 and 52 formed in their free ends. Mounted on said bars 41 and 42 is a transverse plate 43 having apertures 44 extending therethrough; these apertures 44 are adapted to receive the forward portions of the protectors or guards 44a of said sickle 65. Thus as best seen in FIGURE 1, the flat tray is suspended from the sickle 65 and extends forward therefrom and is generally flush to the ground or at a small angle thereto. The leading edge of the flat tray 45 is provided with a rounded point 46 and tapers back to the parallel sides, thus forming a deflector for the row crops. The width of the flat tray is slightly less than the distance between two parallel rows of crops so that the center divider can be positioned between two rows of crops with each row adjacent to one of its side edges. However, as the width of the tray approaches the width of the rows, it becomes difficult to center the harvesting machine with respect to the rows. It has been found that a tray having a width of 31 inches works very well with 40-inch row centers. Along the side edges of the flat tray are provided elevated ridges 47, 48 which reach their highest points at 47', 48' at the junction between the parallel sides 47a, 48a and the tapered leading edges 47b, 48b. These elevated ridges assist in arranging the stalks on the flat tray and their function shall be described in the operation portion of the specification.

The flat tray is arranged with respect to the prostrating means such that the vertex formed by the prostrating bars 10 and 11 and the vertex formed by the prostrating bars 18 and 19 overlie the center line of said flat tray 45.

A divider hoop 32 is secured to the support bar 14, by bolt 20, and to the lower edge of the outer divider 62. The purpose of this divider hoop is to prevent a material buildup around the outer divider 62.

Operation

Referring now to FIGURE 2 of the drawings where a row of stalks identified as A, B, C, D, E, and F have been shown to illustrate how the attachment unit operates on a row of crops. As the harvesting machine with the row crop attachment mounted thereon advances, prostrating arm 10 first engages stalk A. As the harvesting machine with its row crop attachment advances the stalk A will be bent forwardly and towards the center as is illustrated by the stalk B of FIGURE 2. As the harvesting machine and row crop attachment advances still further, the stalk will assume the position illustrated at C in which position the base portion of the stalk has passed the highest point of the elevated ridge 48 of said flat tray, extends beneath the prostrating arm 10 adjacent the vertex formed by said prostrating arms 10 and 11, and over the stalk support rod 12. In position C the stalk is being supported from beneath at two points, the elevated ridge 48 and the stalk support rod 12. Also, the stalk is being engaged by the prostrating bar 10 from above, thus providing a considerable amount of control over the stalk. Upon continued advancement of the harvesting machine the stalk will be severed from the ground by the exposed portions of sickle 65 and the flighting of the auger 64 along with its cooperating pickup roll 66 will function to convey the butt end of the stalk rearwardly and towards the center as illustrated by stalks D, E, and F of FIGURE 2. Since the prostrating means tends to bow the stalk slightly, when the stalk is severed its butt end springs upwardly into engagement with auger 64 and pickup roll 66. Stalk F represents the final position of the stalk which is parallel to the direction of movement of the harvesting machine. From this position the stalk will be moved directly to the rear through the auger 64 and pickup roll 66, over feed roll 69, and between feed rolls 67 and 68 and on to an associated chopping device as will be known to those skilled in the art. Since the stalk has passed the highest point of the elevated ridge 48 at the time it is severed, the stalk upon severance will be confined to the flat tray 45 by the elevated side edges of the tray. The flat tray 45 also functions to catch any pieces that might fall or be torn from the stalks during the bending and severing operations. These loose pieces will then be carried along with the stalks as they are fed rearwardly between the auger 64 and pickup roll 66 and eventually will be fed onto the chopper with the stalks. It has been found that this feature reduces field loss by a considerable amount.

The stalk support rod 12 performs an important role in the efficient operation of the row crop attachment. In the early stage of the operation, such as illustrated at B in FIGURE 2, the stalk support rod functions as a guide for the upper portion of the stalk, holding the end up so that it will not fall into the standing stalks of the other row. As the operation continues, to that illustrated by C in FIGURE 2, the stalk support rod then functions as one point of a three-point wedge, holding the stalk in a desired position. At the time the stalk is severed, stalk support rod 12 cooperates with prostrating bars 10 and 18 and elevated ridge 48 to hold the stalk during the severing operation. During this step of conveying the butt edge of the severed crop towards the center of the harvesting machine, the stalk support rod functions as a pivot point about which the stalk pivots and slides to assume its final position parallel with the forward movement of the harvesting machine.

Thus it is seen that a simple, lightweight row crop attachment for a field harvesting machine, having no moving parts, has been provided.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A two-row crop attachment for a harvesting machine having a sickle operative along a line transverse to the direction of movement of the harvesting machine comprising: a center divider including a tray of a width slightly less than the distance between crop rows and being adapted for mounting over said sickle such that it is generally close to the ground; and unitary prostrating means adapted to be mounted on the harvesting machine in an overlying spaced relationship with said center divider, and including a mounting bar extending forwardly and in spaced relation to the center divider and a pair of bars one of which is mounted on said mounting bar and the other of said pair of bars is adapted to be mounted from the harvesting machine and diverges forwardly from a vertex.

2. The invention as set forth in claim 1 wherein the forward free ends of said diverging bars span a distance greater than the width of said tray.

3. The invention as set forth in claim 1 wherein the vertex of said diverging bars is located forwardly of the operative line of said sickle.

4. The invention as set forth in claim 1 wherein said prostrating means also includes a rod extending over the tray toward the ground and terminating in a lower end terminated above the level of the tray.

5. The invention as set forth in claim 1 wherein said tray comprises side edges provided with elevated ridges along the mid portions thereof and has a flat bottom.

6. The invention as set forth in claim 1 wherein said tray is tapered forwardly and has side edges with elevated ridges.

7. The invention as set forth in claim 4 wherein said tray is flat and comprises side edges with elevated ridges along the mid portion thereof and said tray being inclined rearwardly toward the harvester.

8. In a harvesting machine having a sickle operative transverse to the direction of movement of the harvesting machine, a pickup roll arranged parallel and to the rear of said sickle, and an auger roll parallel and above said sickle and in cooperating engagement with said pickup roll, a row crop attachment comprising: a center divider including a tray of a width slightly less than the distance between crop rows and being mounted on said harvesting machine such that it extends close to the ground; and prostrating means mounted on the harvesting machine in an overlying spaced relationship with said center divider, and including a mounting bar attachable to the harvester and guiding bar means supported from the mounting bar and diverging forwardly from a vertex, and a stalk support bar substantially entered over the tray and projecting between said guiding bar means and having a lower end spaced above said tray.

References Cited in the file of this patent

UNITED STATES PATENTS

| | | |
|---|---|---|
| 785,878 | Heisey | Mar. 28, 1905 |
| 2,867,961 | Heilbrun | Jan. 13, 1959 |
| 2,981,045 | Blanshine et al. | Apr. 25, 1961 |